United States Patent
Plavan et al.

(10) Patent No.: US 8,276,454 B2
(45) Date of Patent: Oct. 2, 2012

(54) MONITORING SYSTEM FOR SELF-SUPPLIED BEARING

(75) Inventors: Davide Plavan, Moncalieri (IT); Massimiliano Titolo, Moncalieri (IT)

(73) Assignee: Sequoia IT S.R.L., Moncarieli (TO) (IT)

( * ) Notice: Subject to any disclaimer, the term of this patent is extended or adjusted under 35 U.S.C. 154(b) by 262 days.

(21) Appl. No.: 12/920,565

(22) PCT Filed: Feb. 26, 2009

(86) PCT No.: PCT/IT2009/000067
§ 371 (c)(1),
(2), (4) Date: Sep. 1, 2010

(87) PCT Pub. No.: WO2009/110018
PCT Pub. Date: Sep. 11, 2009

(65) Prior Publication Data
US 2011/0016980 A1    Jan. 27, 2011

(30) Foreign Application Priority Data
Mar. 4, 2008   (IT) .............................. TO2008A0162

(51) Int. Cl.
*G01M 13/04* (2006.01)
(52) U.S. Cl. .......................................... 73/672; 73/593
(58) Field of Classification Search .................... 73/672, 73/584, 593, 662
See application file for complete search history.

(56) References Cited

U.S. PATENT DOCUMENTS

| | | | | |
|---|---|---|---|---|
| 4,144,745 A * | 3/1979 | Sivill | ........................... | 73/54.31 |
| 4,511,190 A * | 4/1985 | Caye et al. | ................... | 310/90.5 |
| 4,589,707 A * | 5/1986 | Caye et al. | ................... | 310/90.5 |
| 5,873,227 A * | 2/1999 | Arner | ............................. | 56/14.6 |
| 6,463,748 B1 * | 10/2002 | Benedict et al. | ............. | 62/228.1 |
| 6,581,399 B2 * | 6/2003 | Benedict et al. | ............. | 62/228.1 |
| 7,415,365 B2 * | 8/2008 | Jeppe | ............................... | 702/56 |
| 7,800,332 B2 * | 9/2010 | Whinnery | ..................... | 318/466 |
| 2012/0068577 A1 * | 3/2012 | Koser et al. | ................... | 310/339 |

FOREIGN PATENT DOCUMENTS

| | | | |
|---|---|---|---|
| SE | EP 0594 550 A | | 4/1994 |
| WO | WO 02/01086 A | | 1/2002 |

(Continued)

OTHER PUBLICATIONS

Yeatman, E.M., "Rotating and Gyroscopic MEMS Energy Scavenging," Wearable and Implantable Body Sensor Networks, 2006, BSN 2006, International Workshop on Cambridge, MA, USA Apr. 3-5, 2006, Piscataway, NJ, USA, IEEE, Apr. 3, 2006, pp. 42-45.

(Continued)

*Primary Examiner* — J M Saint Surin
(74) *Attorney, Agent, or Firm* — David A. Farah; Sheldon Mak & Anderson PC

(57) ABSTRACT

The present invention describes a system for taking the necessary energy for operating the electronic circuit for monitoring a bearing (A) directly from the rotation movement, namely from the kinetic energy of the bearing i.e by energy harvesting or scavenging. All information read on board the bearing (A) by the sensors (4*a*, 4*b*) are sent through radio with a wireless communication system to an external data collecting and processing unit (6), that is able to evaluate and communicate the status of the bearing (A) being analyzed. The preferred system embodiment provides that the generator (1) bases its operation on the gyroscope (or Coriolis force) effect a circuit (7) for accumulating the necessary energy for turning the system on.

10 Claims, 2 Drawing Sheets

FOREIGN PATENT DOCUMENTS

WO    WO 2007/023214 A    3/2007

OTHER PUBLICATIONS

Cantatore et al., "Energy Scavenging and Power Management in Networks of Automonous Microsensors," Microelectronics Journal, Mackintosh Publications Ltd., Luton, GB, vol. 37, No. 12, Nov. 11, 2006, pp. 1584-1590.

Sequoia IT S.R.L., International Search Report and Written Opinion, PCT/IT2009/000067, Jul. 6, 2009, 12 pages.

* cited by examiner

MONITORING SYSTEM FOR SELF-SUPPLIED BEARING

CROSS-REFERENCE TO RELATED APPLICATIONS

The present Application is a national stage of International Patent Application No. PCT/IT2009/000067, titled "Monitoring System for Self-Supplied Bearing," filed Feb. 26, 2009, which claims priority from Italian Patent Application No. TO2008A000162 filed Mar. 4, 2008, the contents of which are incorporated in this disclosure by reference in their entirety.

BACKGROUND ART

1. Field of the Invention

The present invention refers to a monitoring system for a self-supplied bearing.

2. Background of the Invention

It is known from the prior art that bearings are one of the critical elements of mechanical systems from the point of view of reliability, maintenance costs and replacement costs of associated elements. Monitoring of their wear status and their correct operation, therefore, is of major importance in any quality control, process repeatability and reliability.

Nowadays, the creation of dedicated and finer and finer analysis algorithms contrasts the fact that it is not always possible to place the monitoring sensors (generally for temperature and vibrations) directly on the bearing and, therefore, the performed reading is always affected by a positioning and signal attenuation error.

In order to solve these problems, there are different proposals for monitoring systems on board the bearing (directly inside the bearing or assembled outside) with electronic circuits that need to be supplied with wired or electromagnetic systems; such arrangements, however, make the bearing installation highly complex.

SUMMARY OF THE INVENTION

Therefore, object of the present invention is solving the above prior art problems, by providing a monitoring system for bearings that takes the necessary energy for operating the electronic monitoring circuit directly from the rotation movement, namely from the rotor kinetic energy and, therefore, in practice from the motor that keeps its rotation. This operating method has the clear advantage of not requiring an energy channel dedicated to supply the rotary part, of not needing external connections made through electromagnetic wires or systems capable of supplying energy, and therefore leaving bearing installation form and procedure identical to the traditional ones.

The above and other objects and advantages of the invention, as will appear from the following description, are obtained with a monitoring system as described in claim 1. Preferred embodiments and non-trivial variations of the present invention are the subject matter of the dependent claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
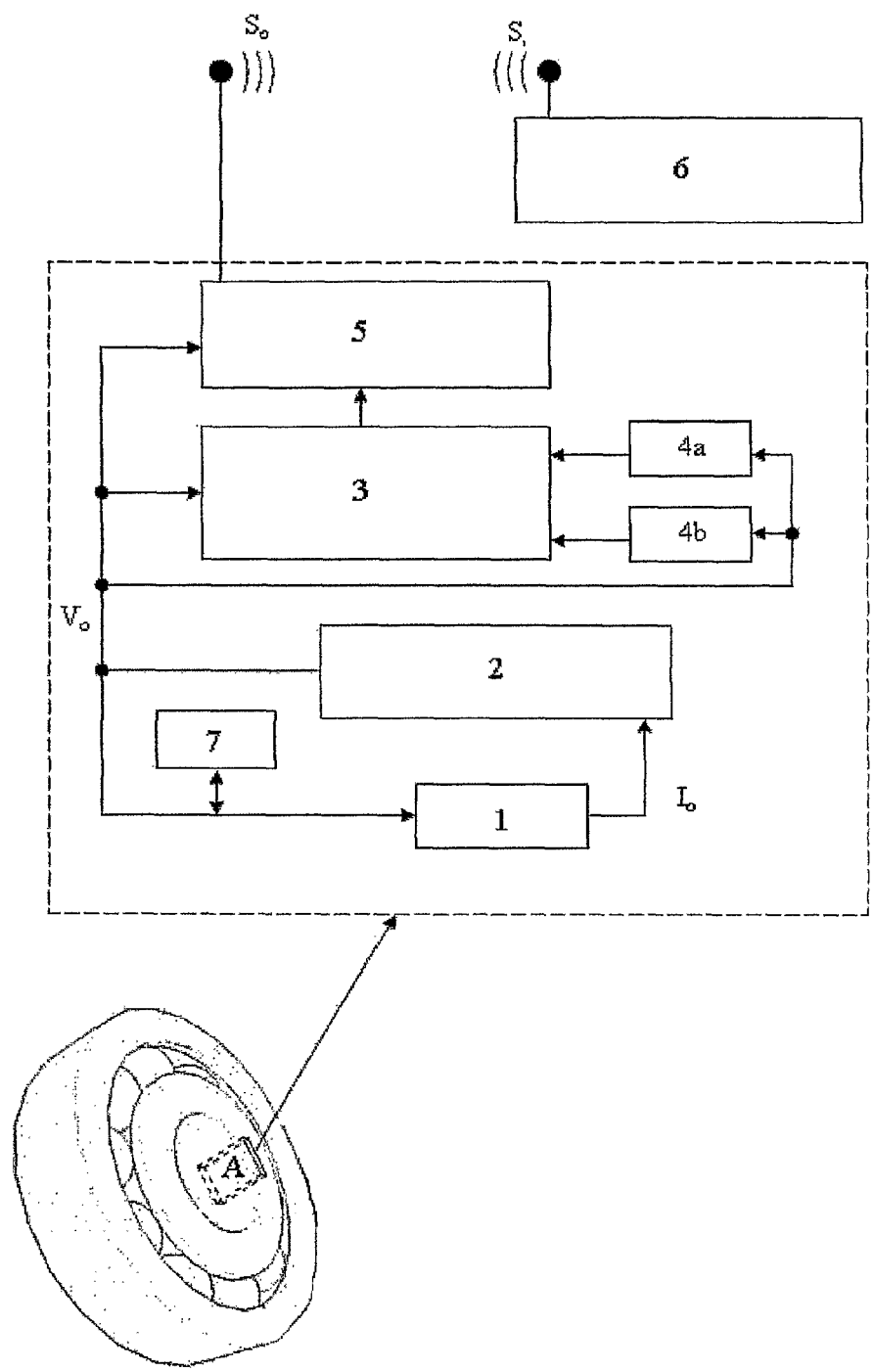
FIG. 1 shows a preferred embodiment of the monitoring system of the invention.

The present invention describes a system for monitoring status and working conditions of a bearing, integrated in the bearing itself (FIG. 1-A) and self-supplied through an energy generating system based on an inertial system.

More precisely, the invention describes the application of a method for taking the necessary energy for operating the electronic monitoring circuit directly from the rotation movement, namely from the rotor kinetic energy and, therefore, in practice from the motor that keeps its rotation. All information read on board the bearing by the sensors are sent through radio with a wireless communication system to an external data collecting and processing unit, able to evaluate the status of the bearing being analysed.

The component (1) called generator bases its operation on the gyroscope effect (or Coriolis force): a mass is radially oscillated with respect to the rotation, producing forces that are perpendicular to the oscillation direction. These forces can produce electric energy in different ways, for example by compressing materials with piezoelectric properties, or by moving capacitor armatures, such as, for example, in the energy generating system described in "Rotating and Gyroscopic MEMS Energy Scavenging-0-7695-2547-4/06 ©2006 IEEE". Such document and the mentioned examples are not intended to limit the scope of the present application: other energy generation modes and forms, all deriving from the gyroscope principle, have to be deemed included within.

It is clear that the energy spent for keeping the generator mass oscillating will have to be lower than the energy produced by the generator itself, so that the energy balance is positive and the use of the proposed system is advantageous.

From the generator (1), therefore, an alternate current Io will then be output. This current is conveyed to a rectifying, stabilising and accumulating circuit (2) and is made available for the supply Vo of the monitoring system in turn composed of a system (3) for collecting data coming from sensors (for example vibration and temperature sensors 4a and 4b), of a wireless transmission circuit (5) for collected information (So) to be transmitted to an external data analysing unit (6), also capable of wireless communication and of receiving collected data (Si), and of a circuit (7) for accumulating the necessary energy for turning the system on.

For the turning-on step, an energy reserve is necessary, that can oscillate the generator mass. A battery can be used, that keeps the oscillation also when the bearing is not rotating. Or a system can be implemented, that is able to recognise when the bearing is rotating and activate the oscillation. Herein below, two arrangements are described for making such system.

The first arrangement consists in making a switch activated by the centrifugal force generated by the rotation. It is an electric contact composed of a fixed part and a moving or flexible part, that at rest is an open circuit; subjected to a certain radial acceleration, the moving part moves or is distorted till the contact is closed. This contact activates the generator and consequently the monitoring system.

Figure 2:
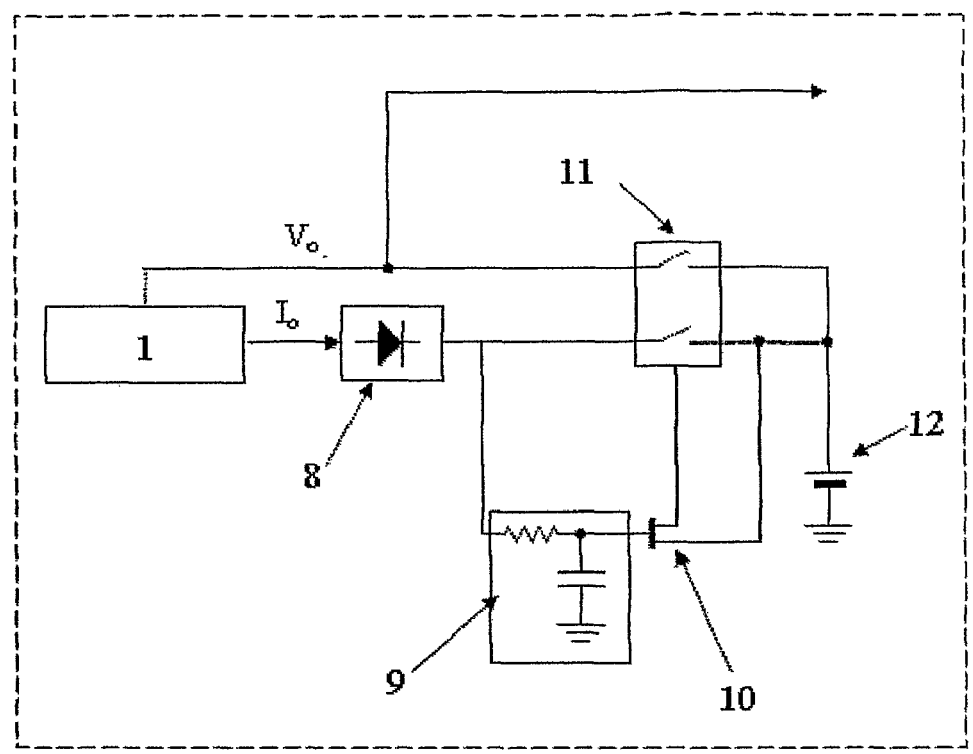
FIG. 2 shows a block diagram of a device, to be used with the invention, that is able to detect the weak signal produced by the generator, though without oscillating, when it is subjected to vibrations, and to thereby activate the generator.

The second arrangement consists in inserting a device that is able to detect the weak signal produced by the generator, though without oscillating, when it is subjected to vibrations, and to thereby activate the generator. This device can be implemented, for example, as shown in FIG. 2, by replacing the embodiment shown in FIG. 1, both the rectifying, stabilising and accumulating circuit (2) and the circuit for accumulating the necessary energy for the start-up phase (7): the signal output from the generator (1) is rectified by a rectifier (8) and filtered by a RC filter (9) before being taken on the JFET transistor gate (10). This latter one in turn drives an electronic switch (11) that enables system supply, generator oscillation and current flow being output from this latter one for recharging the battery (12). Obviously, this implementation assumes that the bearing rotation also generates enough vibration to take the transistor (10) to conduce and that a further part of a circuit is defined for opening the switch (11) when the rotation stops.

Summarising, the following preferred embodiments of the invention can be made:

1) a monitoring system, in the form of an electronic circuit, for monitoring status and working conditions of a bearing, inside the bearing itself and self-supplied through an energy generating system based on an inertial system that is able to take the necessary energy to self-supply itself directly from the mechanical rotation energy of the bearing itself;
2) a system as described in 1) above, composed of an electronic circuit inside one of the bearing rings (the one that during operation will be connected to the rotary part) that is able to collect meaningful data from a network of sensors placed in the same circuit, for example accelerometers and temperature sensors, and to send them through radio waves to an external collecting circuit;
3) a system as described in 1) above, that is able to generate the necessary energy to self-supply itself directly from the mechanical rotation energy of the bearing itself, through an inertial system that is able to oppose the rotation of the bearing generating forces that are able to be exploited by the circuit itself to generate electric energy;
4) a system as described in 3) above, that is able to exploit commercial components, such as MEMS gyroscopes as integrated oscillating inertial system;
5) a system as described in 3) above, that is able to be kept oscillating also during the quiet phase of the bearing through a backup battery that is able to be recharged through a specific section of the electronic circuit of claim 1 during the moving steps of the bearing;
6) a system as described in 3) above, that is able to be activated and start oscillating when the bearing starts rotating;
7) a system as described in 6) above, that is able to be activated through a switch driven by the rotation centrifugal force;
8) a system as described in 6) above, that is able to be activated by generating electric current due to a possible rotation vibration; said current will then be accumulated and rectified till it reaches such a level as to be able to close a contact that allows a backup battery to supply the oscillation system.

The invention claimed is:

1. A monitoring system for monitoring status and working conditions of a bearing, adapted to be contained inside the bearing and self-supplied through an energy-generating system based on an inertial system, the inertial system being able to take the energy to self-supply itself directly from the mechanical rotation energy of the bearing, the monitoring system comprising:
   a generator adapted to output an alternate current;
   a rectifying, stabilizing and accumulating circuit connected to the generator and adapted to receive the alternate current and to supply a voltage to the monitoring system;
   a system for collecting data coming from sensors connected to the rectifying, stabilizing and accumulating circuit;
   a wireless transmission circuit, connected to the data collecting system, for transmitting collected information to an external data-analyzing unit, also configured for wireless communication and for receiving collected data;
   a circuit for accumulating energy for turning the monitoring system on; and
   an energy reserve adapted to oscillate a mass of the generator for turning the monitoring system on, the energy reserve being composed of a system that is configured to recognize when the bearing is rotating and activate the oscillation;
   wherein the system that is adapted to recognize is a switch activated by a centrifugal force generated by a rotation, the switch being an electric contact comprising a fixed part and a moving or flexible part, the moving or flexible part at rest being an open circuit, whereby, when the moving part is subjected to a certain radial acceleration, the moving part is configured to move or be distorted until the electric contact is closed, the electric contact activating the generator and consequently the monitoring system.

2. The monitoring system of claim 1, wherein the sensors are a vibration sensor and a temperature sensor.

3. The monitoring system of claim 1, wherein the generator is configured to operate on a gyroscope effect or a Coriolis force, namely a mass is radially oscillated with respect to the rotation, producing forces that are perpendicular to the oscillation direction, these forces producing electric energy in different ways.

4. The monitoring system of claim 1, wherein the energy reserve is a battery adapted to keep the oscillation also when the bearing is not rotating.

5. The monitoring system of claim 1, wherein the monitoring system is adapted to generate energy to self-supply itself directly from a mechanical rotation energy of the bearing, through an inertial system that is able to oppose the rotation of the bearing and to generate forces that are able to be exploited by the circuit to generate electric energy.

6. A monitoring system for monitoring status and working conditions of a bearing, adapted to be contained inside the bearing and self-supplied through an energy-generating system based on an inertial system, the inertial system being able to take the energy to self-supply itself directly from the mechanical rotation energy of the bearing, the monitoring system comprising:
   a generator adapted to output an alternate current;
   a rectifying, stabilizing and accumulating circuit connected to the generator and adapted to receive the alternate current and to supply a voltage to the monitoring system;
   a system for collecting data coming from sensors connected to the rectifying, stabilizing and accumulating circuit;
   a wireless transmission circuit, connected to the data collecting system, for transmitting collected information to an external data-analyzing unit, also configured for of wireless communication and for receiving collected data;
   a circuit for accumulating energy for turning the monitoring system on; and
   an energy reserve adapted to oscillate a mass of the generator for turning the monitoring system on, the energy reserve comprising a system that is configured to recognize when the bearing is rotating and activate the oscillation;
wherein the system that is configured to recognize is a device that is configured to detect a weak signal produced by the generator, without oscillating, when the device is subjected to vibrations, and to thereby activate the generator, the device comprising a rectifier that is adapted to rectify the weak signal that is output from the generator, and a RC filter that is configured to filter the weak signal, the signal being then taken on a JFET transistor gate, the gate being configured to drive an electronic switch that is adapted to enable to supply the system, to oscillate the generator and to output a flow of current from the generator for recharging a battery.

7. The monitoring system of claim 6, wherein the sensors are a vibration sensor and a temperature sensor.

8. The monitoring system of claim 6, wherein the generator is adapted to operate on a gyroscope effect or a Coriolis force, namely a mass is radially oscillated with respect to the rotation, producing forces that are perpendicular to the oscillation direction, these forces producing electric energy in different ways.

9. The monitoring system of claim 6, wherein the energy reserve is a battery adapted to keep the oscillation also when the bearing is not rotating.

10. The monitoring system of claim 6, wherein the monitoring system is adapted to generate energy to self-supply itself directly from a mechanical rotation energy of the bearing, through an inertial system that is able to oppose the rotation of the bearing and to generate forces that are able to be exploited by the circuit to generate electric energy.

* * * * *